Figure 1:
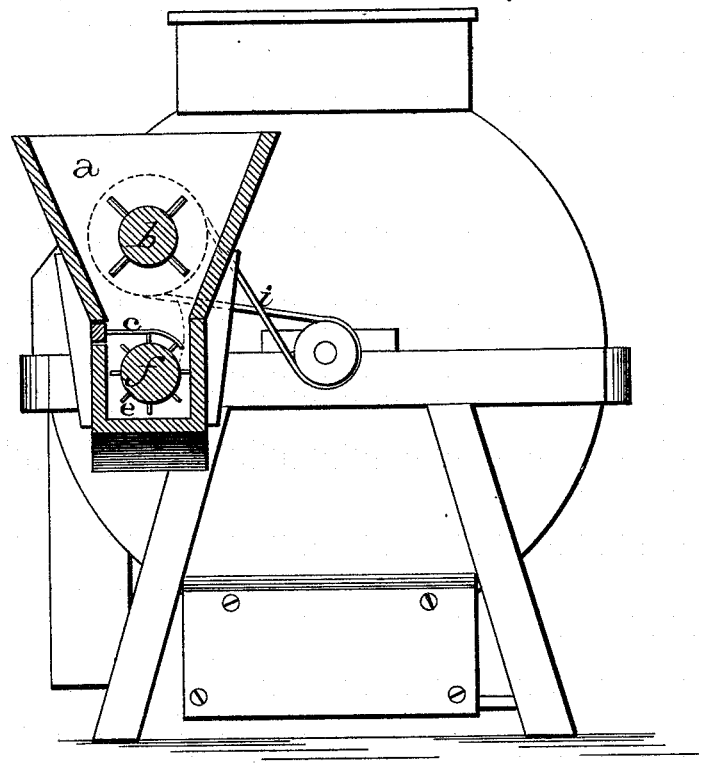
Figure 2:
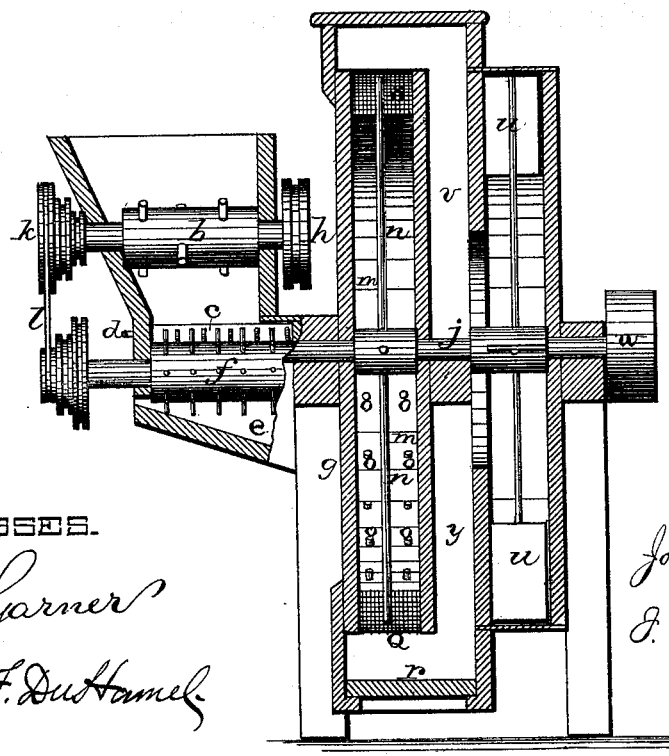

2 Sheets—Sheet 1.

J. W. CLARKE.
Seed-Cotton Cleaner.

No. 202,931. Patented April 30, 1878.

WITNESSES.
J W Garner
Jas. F. DuHamel

INVENTOR
Jos. W. Clarke,
per
J. A. Lehmann,
atty.

N. PETERS, PHOTO-LITHOGRAPHER, WASHINGTON, D. C.

2 Sheets—Sheet 2.
J. W. CLARKE.
Seed-Cotton Cleaner.
No. 202,931. Patented April 30, 1878.
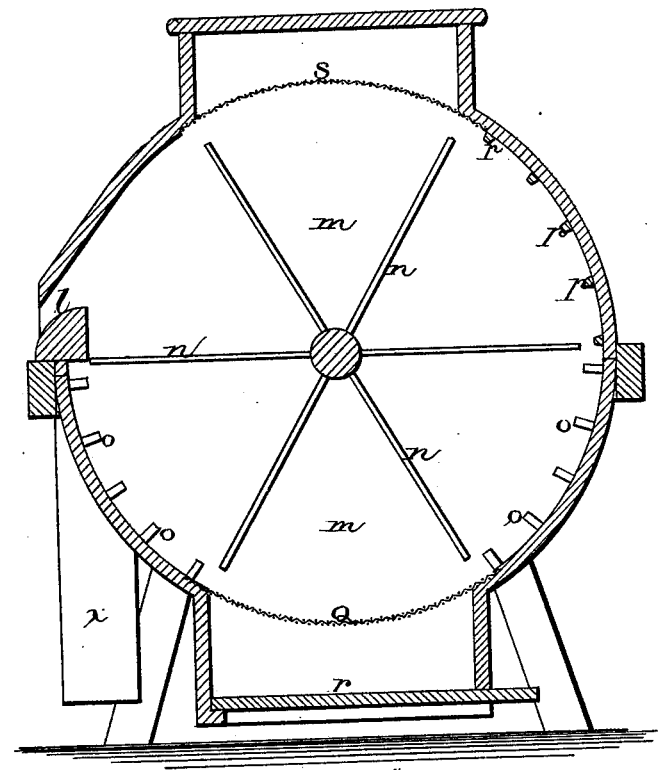
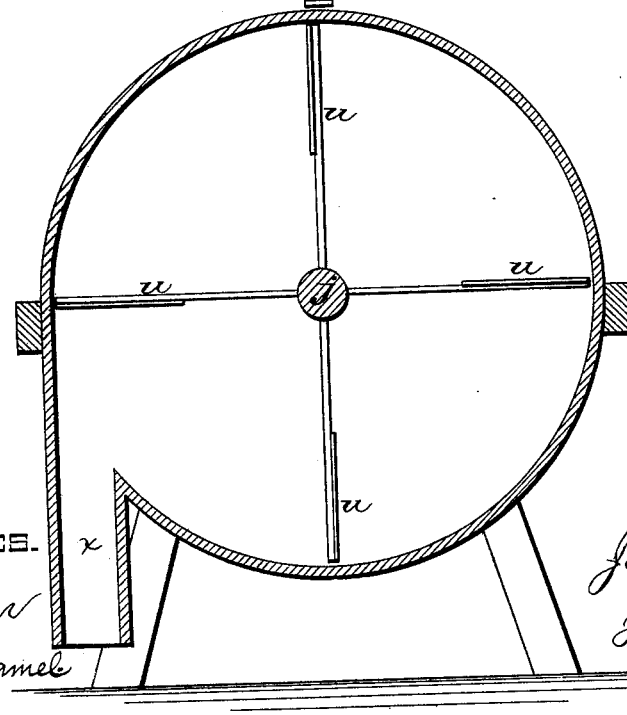
WITNESSES.
J W Garner
Jas. F. DuHamel
INVENTOR.
Jos. W. Clarke,
per
F. A. Lehmann,
Atty.

UNITED STATES PATENT OFFICE.

JOSEPH W. CLARKE, OF NEWNAN, GEORGIA.

IMPROVEMENT IN SEED-COTTON CLEANERS.

Specification forming part of Letters Patent No. 202,931, dated April 30, 1878; application filed February 21, 1878.

*To all whom it may concern:*

Be it known that I, JOSEPH W. CLARKE, of Newnan, in the county of Coweta and State of Georgia, have invented certain new and useful Improvements in Seed-Cotton Cleaners; and I do hereby declare the following to be a full, clear, and exact description of the invention, such as will enable others skilled in the art to which it pertains to make and use it, reference being had to the accompanying drawings, which form a part of this specification.

My invention relates to an improvement in seed-cotton cleaners; and it consists in the combination of the parts whereby the cotton is whipped or shaken, so as to separate dirt and foreign substances from it, and all dust sucked or drawn away from the whipping-chamber, so that the cotton is discharged from the machine perfectly clean, as will be more fully described hereinafter.

The accompanying drawings represent my invention.

$a$ represents a hopper, of any suitable construction, into which the raw cotton is placed. Passing through the hopper some distance above its bottom is the toothed cylinder $b$, which catches the cotton and forces it downward upon the rack $c$. This rack is made of suitable iron rods or bars, placed sufficiently near together to prevent the seed-cotton from passing through between them, and is connected to a lever, $d$, extending outside of the frame, so that it can be raised and lowered at will. The free ends of this rack do not extend entirely across the throat of the hopper, but leave sufficient room for the seed-cotton to fall down in the chamber $e$ beneath. Revolving horizontally through this chamber $e$ is another toothed cylinder, $f$, the spikes of which revolve in between the rods or bars of the rack, and catch hold of the cotton as it is fed downward by the toothed cylinder above. The cotton also falls down into the chamber $e$, below which is a slanting bottom, so as to cause the cotton to drop into the whipper-chamber $m$.

Upon the inner end of the cylinder $b$ is placed a driving-pulley, $h$, over which passes the crossed belt $i$ direct from the main shaft $j$. Upon the outer end of this cylinder is placed a second pulley, $k$, from which passes a driving-belt, $l$, for the purpose of operating the cylinder $f$. These two cylinders $b f$, it will be seen, revolve in the opposite direction from the main shaft $j$.

As the cotton falls from the chamber $e$ into the whipper-chamber $m$ it is caught by the radial arms $n$, carried around and around for the purpose of giving it a thorough agitation or shaking, so as to separate from it all the sand, dirt, or other foreign substances which may have become mixed with it. For the purpose of more thoroughly cleaning the cotton, the sides of the bottom of the chamber $m$ are provided with conical projections $o$, and one side of the top of the chamber, opposite the discharge, is provided with cross-ribs $p$. The cotton, in being carried around by the radial arms $n$, strikes against these projections, and is thoroughly loosened from all foreign substances. The bottom of this chamber $m$ is covered by a wire screen, $q$, down through which the sand and dirt fall. Under the bottom of this chamber is placed the slide $r$, which serves to regulate the draft of air. In the top of this chamber is placed another screen, $s$, up through which the air passes toward the fan-chamber. At the point $l$ the cotton is thrown from the frame cleaned from dirt and all other impurities.

Projecting from the driving-shaft $j$ and revolving in a chamber placed beside the chamber $m$, is a blast-fan, $u$, which draws air in through the screen in the top of the chamber $m$, down through the passage $v$ in between the two chambers, to the center of the fan. By thus drawing the air up through the chamber $m$ all the dust and light floating impurities in the whipper-chamber will be drawn into the fan-chamber and blown out at the point $x$.

In between the fan-chamber and the chamber $m$ is located an air-passage, $y$, communicating with the opening controlled by the slide $r$ and the center of the fan. By means of this opening a less quantity of air is made to pass through the chamber $m$, and thus the draft in that chamber can be regulated at will.

Upon the outer end of the driving-shaft $j$ is placed the driving-pulley $w$, by means of which the whole machine is set in operation.

By the arrangement and combination of devices above described, it will be seen that the cotton is whipped and subjected to a blast of air, so as to thoroughly cleanse the cotton before it is discharged from the machine and preparatory to ginning. By thus combining a whipper and a fan the cotton is cleaned so thoroughly as to make the ginning much easier.

When properly constructed, there will be but little more power required to operate this machine, in connection with the ordinary cotton-gin, than is required to operate the ordinary cotton-gin by itself.

Having thus described my invention, I claim—

1. In a cotton-seed cleaner, the combination of a whipper-chamber, $m$, provided with projections $o$ on its inner surface, a screen, $q$, at its bottom, and a screen, $s$, at its top, for the passage of air, whipper $n$, slide $r$, air-passage $v$, and the fan, substantially as shown.

2. The combination of the whipper-chamber $m$, having the whipper revolving therein, and provided with the screens $q$ $s$, slide $r$, air-passages $v$ $y$, and the fan-chamber, the whipper and fan chambers being separate and distinct, and the air-passages being placed between them, substantially as described.

In testimony that I claim the foregoing I have hereunto set my hand this 4th day of February, 1878.

JOS. W. CLARKE.

Witnesses:
W. WELLS,
P. F. SMITH.